(12) United States Patent
Zhou et al.

(10) Patent No.: US 9,378,724 B2
(45) Date of Patent: Jun. 28, 2016

(54) METHOD AND SYSTEM FOR IMPLEMENTING NEAR FIELD COMMUNICATION

(71) Applicant: TENCENT TECHNOLOGY (SHENZHEN) COMPANY LIMITED, Shenzhen, Guangdong (CN)

(72) Inventors: Pengli Zhou, Guangdong (CN); Chang He, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 14/004,128

(22) PCT Filed: Nov. 28, 2012

(86) PCT No.: PCT/CN2012/085447
§ 371 (c)(1),
(2) Date: Sep. 9, 2013

(87) PCT Pub. No.: WO2013/078996
PCT Pub. Date: Jun. 6, 2013

(65) Prior Publication Data
US 2014/0146643 A1    May 29, 2014

(30) Foreign Application Priority Data
Nov. 28, 2011    (CN) .......................... 2011 1 0384024

(51) Int. Cl.
*G01K 11/18*    (2006.01)
*G10K 11/18*    (2006.01)
*H04B 11/00*    (2006.01)

(52) U.S. Cl.
CPC ................ *G10K 11/18* (2013.01); *H04B 11/00* (2013.01)

(58) Field of Classification Search
CPC ............................... G10K 11/18; H04B 11/00
USPC ........ 367/134–135; 455/20–21, 93, 118, 131, 455/142, 190.1, 207, 313, 314, 323, 413; 370/247
See application file for complete search history.

(56) References Cited

U.S. PATENT DOCUMENTS 4,969,180 A * 11/1990 Watterson ........... H04M 1/0285
                                                              379/434
6,133,849 A    10/2000 McConnell et al.
(Continued)

FOREIGN PATENT DOCUMENTS

CN    101218768    7/2008
CN    101933242    12/2010
(Continued)

*Primary Examiner* — Luke Ratcliffe
*Assistant Examiner* — Amienatta M Ndure Jobe
(74) *Attorney, Agent, or Firm* — Kirton McConkie; Evan R. Witt

(57) ABSTRACT

Disclosed are a method and a system for implementing near field communication (NFC). The method includes: modulating a digital signal to generate an audio signal with a transmitting device by utilizing a binary frequency shift keying modulation scheme; playing the generated audio signal with the transmitting device; receiving the audio signal by a receiving device; sampling the audio signal by the receiving device; and demodulating the sampled audio signal for obtaining the digital signal by the receiving device. The present disclosure is capable of implementing NFC between mobile communication devices not having NFC chips equipped, thereby solving the problems that hardware requirements which utilize schemes of the NFC standard are higher, and current application ranges are narrow.

6 Claims, 2 Drawing Sheets

(56) References Cited

U.S. PATENT DOCUMENTS

| | | | |
|---|---|---|---|
| 6,160,857 A | 12/2000 | Yang | |
| 6,300,880 B1 * | 10/2001 | Sitnik | H04L 29/06 235/375 |
| 6,765,972 B1 | 7/2004 | Kawasaki et al. | |
| 6,934,521 B1 | 8/2005 | Fleury et al. | |
| 8,150,321 B2 | 4/2012 | Winter et al. | |
| 8,411,531 B2 | 4/2013 | Matsuoka et al. | |
| 8,498,860 B2 | 7/2013 | Matsuoka | |
| 8,792,305 B2 | 7/2014 | Booij et al. | |
| 9,172,536 B2 | 10/2015 | Lu et al. | |
| 2004/0066298 A1 * | 4/2004 | Schmitt | A01K 15/023 340/573.3 |
| 2004/0193303 A1 * | 9/2004 | Fore, Sr. | B65H 67/052 700/126 |
| 2004/0208324 A1 * | 10/2004 | Cheung | H04S 1/00 381/77 |
| 2005/0049732 A1 | 3/2005 | Kanevsky et al. | |
| 2005/0085760 A1 * | 4/2005 | Ware | A61M 1/3441 604/4.01 |
| 2005/0128099 A1 * | 6/2005 | Drouin | G06K 19/0723 340/8.1 |
| 2005/0129254 A1 * | 6/2005 | Connor | H04R 1/403 381/77 |
| 2006/0122504 A1 * | 6/2006 | Gabara | H04B 11/00 600/437 |
| 2007/0036368 A1 * | 2/2007 | Hettinger | G07F 17/32 381/107 |
| 2008/0173717 A1 * | 7/2008 | Antebi | G01S 5/22 235/439 |
| 2008/0243491 A1 | 10/2008 | Matsuoka | |
| 2010/0277646 A1 * | 11/2010 | Jeong | H04R 5/02 348/564 |
| 2011/0023691 A1 | 2/2011 | Iwase et al. | |
| 2011/0150240 A1 | 6/2011 | Akiyama et al. | |
| 2012/0171963 A1 * | 7/2012 | Tsfaty | H04B 11/00 455/41.3 |
| 2013/0282373 A1 * | 10/2013 | Visser | G10L 21/0208 704/233 |

FOREIGN PATENT DOCUMENTS

| | | | |
|---|---|---|---|
| CN | 101983403 | 3/2011 | |
| CN | 102223234 | 10/2011 | |
| EP | 2166683 | 3/2010 | |
| JP | H03101546 | 4/1991 | |
| JP | H11234045 | 8/1999 | |
| JP | 2001045083 | 2/2001 | |
| JP | 2001100772 | 4/2001 | |
| JP | 2004015762 | 1/2004 | |
| JP | 2006251676 | 9/2006 | |
| JP | 2007104598 | 4/2007 | |
| JP | 2010537535 | 12/2010 | |
| KR | 100284698 | 3/2001 | |
| WO | 9731437 | 8/1997 | |
| WO | WO 9731437 A1 * | 8/1997 | H04B 11/00 |
| WO | 2008020198 | 2/2008 | |

* cited by examiner

METHOD AND SYSTEM FOR IMPLEMENTING NEAR FIELD COMMUNICATION

CROSS REFERENCE TO RELATED APPLICATION

This application claims the benefit and priority of Chinese Application No. 2011103840248, filed on Nov. 28, 2011. The entire disclosure of the above application is incorporated herein by reference.

TECHNICAL FIELD

The present disclosure relates to a field of modulating and demodulating sound waves, and more particularly to a method and a system for implementing near field communication technology.

BACKGROUND

A near field communication (NFC), which is also called as a short-range wireless communication, is a short-range high frequency wireless communication technology and allows electronic devices to implement contactless point-to-point data transmission between them for exchanging data within a short distance such as 10 centimeters. An NFC chip is mainly applied to a mobile communication device, so the mobile communication device can implement electronic micropayments and read information of other NFC devices or tags. Short-range interactions with the NFC greatly simplify the overall authentication and identification processes. Through the NFC, wireless connections can be conveniently and quickly established between plural devices such as computers, digital cameras, mobile phones, PDAs and so on.

The conventional NFC technology becomes an industry standard and has incomparable advantages on security and communication efficiency. However, it can be seen that methods of the standard NFC depend on specific hardware such as NFC chips. However, most mobile communication devices currently do not have the NFC chips equipped. Therefore, hardware requirements by utilizing schemes of the NFC standard are relatively hard to meet, and current application ranges are limited narrow.

SUMMARY OF THE DISCLOSURE

The present disclosure provides a method and a system for implementing near field communication (NFC) which is capable of implementing NFC between mobile communication devices not having NFC chips equipped, thereby solving the problems that hardware requirements by utilizing schemes of the NFC standard are higher, and current application ranges are narrow.

Some technical schemes may be implemented as follows:

An embodiment method for implementing near field communication comprises:

modulating a digital signal to generate an audio signal with a transmitting device by utilizing a binary frequency shift keying (2FSK) modulation scheme;

playing the generated audio signal by the transmitting device;

receiving the audio signal by a receiving device;

sampling the audio signal by the receiving device; and demodulating the sampled audio signal for obtaining the digital signal by the receiving device.

Amongst, a modulating frequency of a binary bit "0" in the digital signal is set as 12 KHz, a modulating frequency of a binary bit "1" in the digital signal is set as 16 KHz, and a modulating width is set to have 1000 sampling points in the 2FSK modulation scheme.

An embodiment system for implementing near field communication comprises:

a transmitting device for modulating a digital signal to generate an audio signal and playing the generated audio signal; and a receiving device for receiving the audio signal, sampling the audio signal and demodulating the sampled audio signal for obtaining the digital signal.

Amongst, a modulating frequency of a binary digital signal "0" in the digital signal is set as 12 KHz, a modulating frequency of a binary digital signal "1" in the digital signal is set as 16 KHz, and a modulating width includes 1000 sampling points in the 2FSK modulation scheme.

Apparently, the embodiments of the method and the system for implementing the NFC of the present disclosure adopt speakers and microphones disposed in the general mobile communication devices and technologies of modulating and demodulating sound waves for implementing the NFC between the mobile communication devices, thereby solving the problems in the existing art that hardware requirements by utilizing schemes of the NFC standard are higher and the current application ranges are narrow.

BRIEF DESCRIPTION OF THE DRAWINGS

To clarify embodiments of the present disclosure or technical schemes in the prior arts, appended drawings required in the descriptions of the embodiments and the prior arts are briefly described as follows. Apparently, the following drawings merely illustrate some embodiments of the present disclosure. For those skilled in the art, other drawings may be acquired according to the drawings without devoting effort.

DETAILED DESCRIPTION OF THE DISCLOSURE

Figure 1:
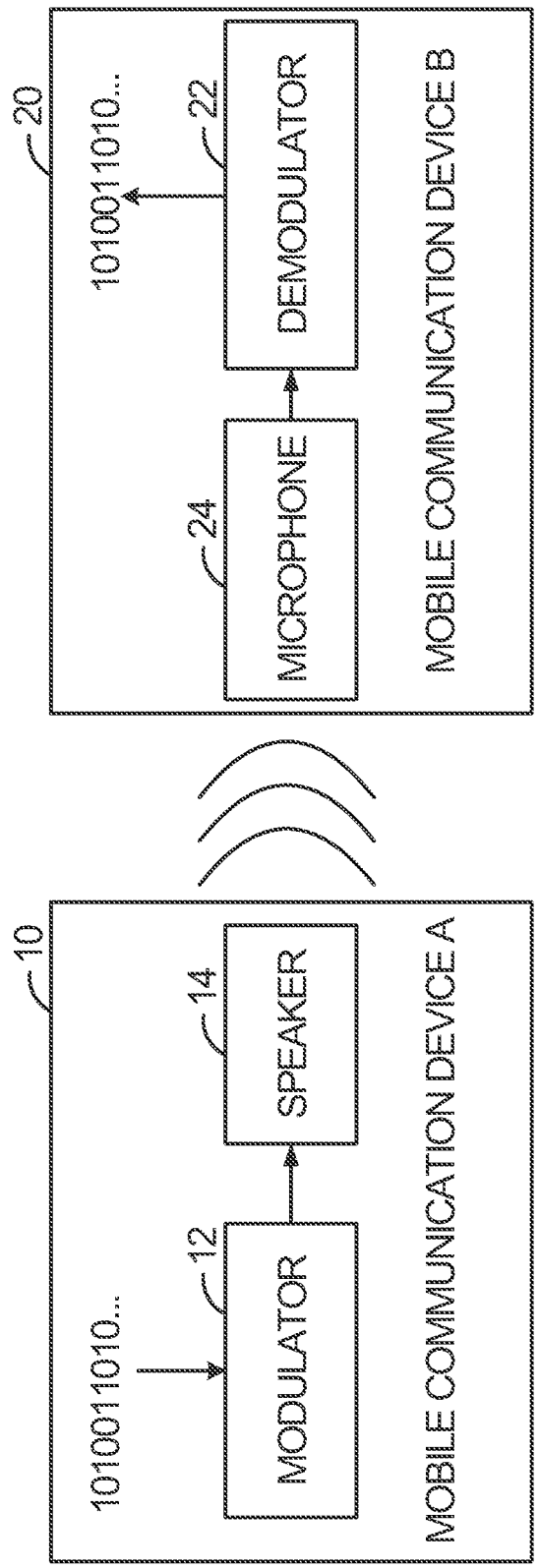
FIG. 1 is a schematic diagram illustrating a configuration of a system for implementing the near field communication (NFC) in accordance with the present disclosure.

The technical scheme provided in embodiments of the present disclosure will be clearly and completely described below with reference to accompanying drawings, it should be appreciated that the embodiments described herein are merely part of, but not all of, the possible embodiments of the present disclosure, and that other embodiments devised by those of ordinary skill in the art based on the embodiments herein without making creative efforts are within the protection scope of the present disclosure.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The description will be made as to the embodiments of the present invention in conjunction with the accompanying drawings in FIGS. 1-2. It should be understood that specific embodiments described herein are merely intended to explain the present invention, but not intended to limit the present invention. In accordance with the purposes of this invention, as embodied and broadly described herein, this invention, in one aspect, relates to method, system and client terminal for detection of phishing websites.

The present disclosure discloses a method for implementing near field communication (NFC), and the NFC is implemented by utilizing a speaker and a microphone disposed in a mobile communication devices. FIG. 1 is a schematic diagram illustrating a configuration of a system for implementing the NFC in accordance with the present disclosure. Amongst, a mobile communication device A is a transmitting device 10 comprising a modulator 12 and a speaker 14, and a mobile communication device B is a receiving device 20 comprising a demodulator 22 and a microphone 24. Examples of mobile communication devices A, B that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

Figure 2:
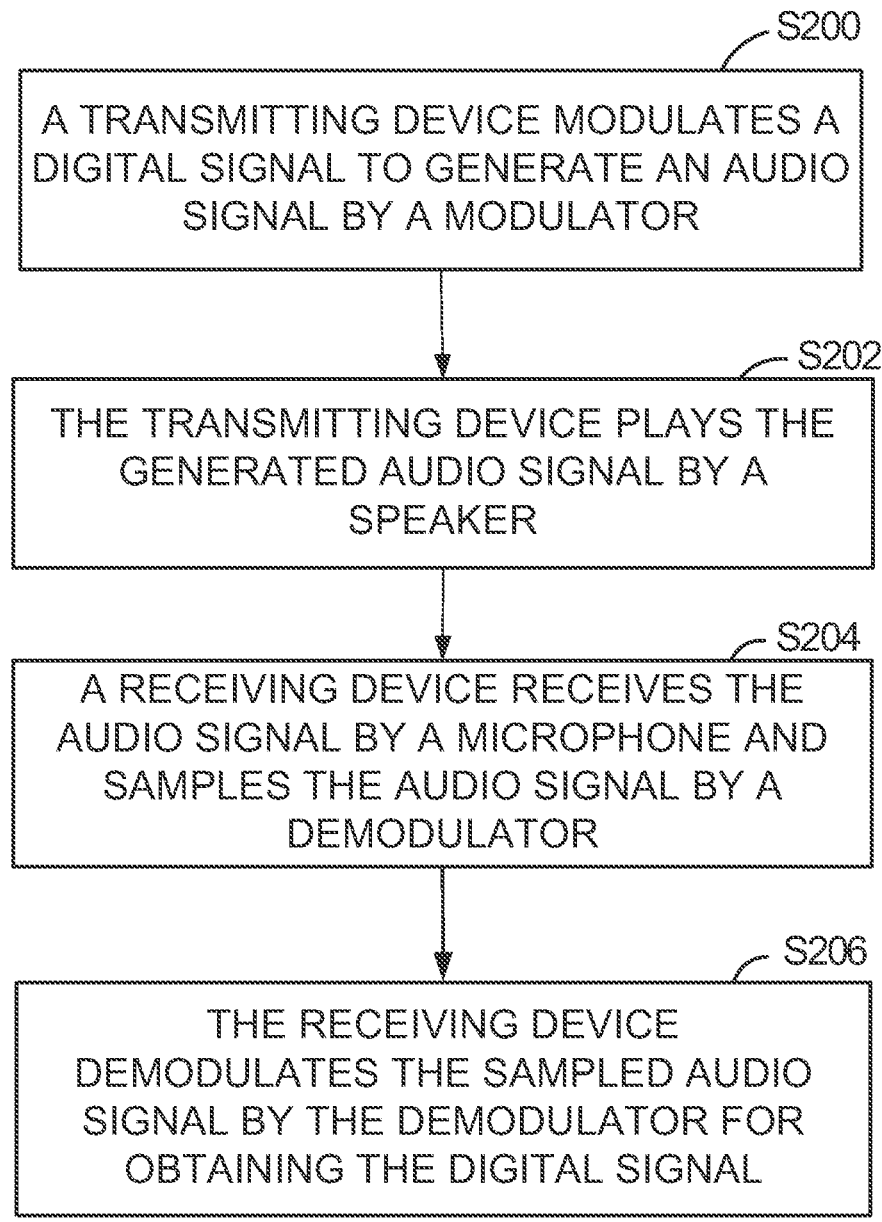
FIG. 2 is a schematic diagram illustrating a flowchart of a method for implementing the near field communication (NFC) in accordance with the present disclosure.

A method for implement the NFC by the system as shown in FIG. 1 comprises the following steps as shown in FIG. 2:

in step S200, the transmitting device 10 modulates a digital signal to generate an audio signal by the modulator 12;

in step S202, the transmitting device 10 plays the generated audio signal by the speaker 14;

in step S204, the receiving device 20 receives the audio signal by the microphone 24 and samples the audio signal by the demodulator 22; and in step S206, the receiving device 20 demodulates the sampled audio signal by the demodulator 22 for obtaining the digital signal.

A specific embodiment is described in detail as follows.

In the present embodiment, modulating the digital signal by the modulator 12 of the transmitting device 10 comprises: modulating to generate audio signal by utilizing a binary frequency shift keying (2FSK) technique. A sampling frequency of the audio signal is 48 KHz. A channel number used therein is a single channel. A quantization used therein is an 8-bit quantization.

According to the sampling theorem: $f0 \geq 2f$, that is, the sampling frequency f0 must be greater than or equal to twice a maximum frequency of a sampled wave. In the present embodiment, when the digital signal is modulated, a modulating frequency f1 of a binary digital signal "0" is set as 12 KHz, while a modulating frequency f2 of a binary digital signal "1" is set as 16 KHz.

Due to the above-mentioned settings, the audio signal may be represented as: $y=128+127*\sin(2\pi f x)$.

Amongst, y is an amplitude quantization value, and x indicates time.

Because the sampling frequency is f0, $x=N/f0$. The audio signal may be further represented as: $y=128+127*\sin(2\pi f N/f0)$.

Amongst, f is a modulating frequency. N is a quantity of sampling points. When the modulated digital signal is "0", $f=f1=12$ KHz; when the modulated digital signal is "1", $f=f2=16$ KHz.

Furthermore, a modulating width is required to be set. The sampling frequency is 48 KHz, that is, 48000 points per second are sampled. If a modulating width is set to have 1000 points, a modulating time t=1000/f0=0.02s. That is, a frequency of the audio signal in the modulating time is fixed as a frequency corresponding to the modulated digital signal.

Since a transmitting rate=sampling frequency/modulating width, it can be obtained that 48-bit data can be transmitted per second. That is, the transmitting rate of data is 48 bps (bits per second).

According to the above-mentioned settings, the binary digital signal is modulated firstly. A 96-bit binary digital signal "101001101010100110101010011010101010011010 101001101010100110101010011010101001101010100 11010000000" including 96 bits may be modulated as an audio signal of 2 seconds. After testing, the transmitting device 10 plays the audio signal by the speaker 14.

The demodulator 22 of the receiving device 20 samples the audio signal and utilizes a software algorithm for demodulating the sampled audio signal. Specifically, the sampled audio signal is analyzed by utilizing a Fast Fourier Transform (FFT). Every 64 points are used as an analyzing period, and spectral characteristics thereof are served as frequency characteristics in a middle period for analyzing a frequency signal having a maximum power in the spectrum. If a frequency of one point having the maximum power is closest to 12 KHz, then an output result is "0". If a frequency of one point having the maximum power is closest to 16 KHz, then an output result is "1". If the frequency is not closest to 12 KHz or 16 KHz, then it is an environmental audio sound and there is no output result. There is no output result, and it is represented as "_". The frequency spectrum of one analyzing period is shown in the following table.

| Frequency | Amplitude |
|---|---|
| 0 KHz | 39 |
| 0.68906 KHz | 562 |
| 1.37813 KHz | 382 |
| 2.06719 KHz | 362 |
| 2.75625 KHz | 737 |
| 3.44531 KHz | 1142 |
| 4.13438 KHz | 1007 |
| 4.82344 KHz | 59 |
| 5.51250 KHz | 411 |
| 6.20156 KHz | 634 |
| 6.89063 KHz | 533 |
| 7.57969 KHz | 624 |
| 8.26875 KHz | 521 |
| 8.95781 KHz | 556 |
| 9.64687 KHz | 535 |
| 10.3359 KHz | 304 |
| 11.0250 KHz | 510 |
| 11.7141 KHz | 828 |
| 12.4031 KHz | 651 |
| 13.0922 KHz | 109 |
| 13.7813 KHz | 234 |
| 14.4703 KHz | 247 |
| 15.1594 KHz | 620 |
| 15.8484 KHz | 4492 |
| 16.5375 KHz | 1214 |
| 17.2266 KHz | 559 |
| 17.9156 KHz | 391 |
| 18.6047 KHz | 49 |
| 19.2937 KHz | 337 |
| 19.9828 KHz | 387 |
| 20.6719 KHz | 534 |
| 21.3609 KHz | 258 |

It can be seen from the above-mentioned table that the power of the wave is concentrated on a low-frequency portion and the vicinity of 16 KHz, and the maximum of the power appears in the vicinity of 16 KHz. Accordingly, the output result of the analyzing period is "1". If the power is concentrated on the vicinity of 12 KHz, then the output is "0". If the power is concentrated on the low-frequency portion, then the output is "_". The sampled audio signal is composed of several analyzing periods. The overall output after analyzing is:
"_____11111111111_0_00000000000_
111111111111_0_000000000000000000000000_
111111111111111111111111100000000000000_1_
111111111_0100000000000_1111111111111_
0000000000000_111111111111_000000000000000000
0000000000_11111111111111111111111_
0100000000000_111111111111_00000000000000_
1111111111_0000000000_1111111111_
00000000000000000000000000
11111111111111111111111111_0100000000000_
1111111111_0000000000000_1111111111111_
0000000000000_111111111111_01000000000000000000
00000000_11111111 111111111111111111_00000000000_
111111111111_00_000000000_111111111111_00
000000000000_111111111111_00000000000000000000
000000000_1111111111111111111111111_
00000000000000_1111111111111100000000000000_1_
111111111_00000000000_1111111111111_0000000000
00000000000000000_11111111111111111111111111_
0000000000000_111111111111_00000000000000_
1111111111111000000000000000_111111111_
10000000000000000000000000_1111111111111111111
111111_10000000000000_1_111111111_000000000000_
1_1111111111_0000000000000_111111111111_00000
000000000000000000000_1_1111111111111111111111
1111_0100000000000_1111111111 111_00000000000_
11_1111111111_10000000000000_11111111111110000
0000000000000 000000000000_1111111111111111111
111111111_0000000000000_1111111111111100000000000
0000000000000000000000000000000000000000000000000
00000000000000000000000000000000000000000
0000_____".

Since a modulating period includes 1000 sampling points and one analyzing period includes 64 points herein, 15.625 analyzing periods constitute a modulating period. A statistical analysis is performed on the output results by using a window with a length of 16 bits. If "1" within the window occurs more, then the obtained demodulated digital signal is "1". Otherwise, the obtained demodulated digital signal is "0". Then, the window is shifted by a displacement for analyzing the next one. A distance of the displacement is determined by the content of the current window. A count value FLAG is set into 0 as an initial value thereof. When the window is traversed from left to right, the count value FLAG is increased by 1 on the situation that "1" is met; the count value FLAG is decreased by 1 on the situation that "0" is met; the count value FLAG is unchanged in other situations. A bit position corresponding to a maximum absolute value of the count value FLAG (indicates a distance required to be shifted (the distance of bit position to shift is a right-most bit position corresponding to the maximum absolute value the same). If the current window is "11111111111_0_0", then the position of the maximum absolute value (11) of the count value FLAG is 13. Accordingly, the window should be shifted to the right by 13 positions for continual analysis, so on and so forth. The rest can be done in the same manner to obtain a final demodulated result as: "101001101010100110101010 0110101010011010101001101010100110101010011010 10 0110101010011010000000". The final demodulated result is the same as the originally modulated binary digital signal, thereby successfully implementing the demodulating process.

In the above-mentioned embodiment, the specific values of the sampling frequency f0, the modulating frequencies f1, f2, the modulating method, the modulating width and the width of the analyzing window are only exemplary rather than limiting the present disclosure. The technical schemes by simply modifying the specific values are within the protection scope of the present disclosure.

The present disclosure further discloses a system for implementing NFC, which comprises:

a transmitting device 10 for modulating a digital signal and playing the generated audio signal; and a receiving device 20 for receiving the audio signal, sampling the audio signal and demodulating the sampled audio signal for obtaining the digital signal.

As shown in FIG. 1, the transmitting device 10 comprises the modulator 12 and the speaker 14. The receiving device 20 comprises the demodulator 22 and the microphone 24.

In the above-mentioned system, the transmitting device 10 modulates the digital signal by utilizing a 2FSK modulation, scheme by the modulator 12 to generate the audio signal. The transmitting device 10 plays the audio signal by the speaker 14. A modulating frequency f1 of a binary digital signal "0" is set as 12 KHz, while a modulating frequency f2 of a binary digital signal "1" is set as 16 KHz. A modulating width includes 1000 sampling points.

The receiving device 20 receives the audio signal by the microphone 24 and samples the audio signal with the demodulator 22 by using a sampling frequency of 48 KHz, a single channel and an 8-bit quantization.

A method for demodulating the sampled audio signal by the demodulator 22 of the receiving device 20 comprises the following steps.

The sampled audio signal is transformed from a time domain signal to a frequency domain signal.

The sampled audio signal in the frequency domain is analyzed-by using 64 points as an analyzing period. If a frequency of one point having a maximum power is closest to 12 KHz, then an output result is "0". If a frequency of one point having a maximum power is closest to 16 KHz, then an output result is "1".

A statistical analysis is performed on the said output results by using a window with a length of 16 bits. If "1" in the output results within the window occurs more, then the demodulated digital signal is "1". If "0" in the output results within the window occurs more, then the demodulated digital signal is "0". The window is shifted for continuing to perform the above-mentioned statistical analysis on the above-mentioned output results until all of the entire digital signal has been demodulated.

A distance to shift the window is set by the following steps. A count value is set into 0 as an initial value thereof. The output results within the window are traversed. The count value is increased by 1 when traversing to "1". The count value is decreased by 1 when traversing to "0". A bit position corresponding to a maximum absolute value of the count value indicates the distance to shift the window.

In conclusion, the method and the system for implementing the NFC of the present disclosure adopt the speaker 14 and the microphone 24 in the mobile communication devices, utilizes the software algorithm for modulating the digital signal, and then plays the generated audio signal through the speaker 14. The other mobile communication device samples the audio signal through the microphone 24 and performs an algorithm analysis on the sampled data for implementing the demodulation. The interactive method can implement little data between two mobile communication devices in the NFC and can be applied to offline payments and similar conditions.

It is noted that the above-mentioned embodiments of the methods are described as combinations of a series of actions for simplifying descriptions. However, those skilled in the art should appreciate that the present disclosure is not limited to sequences of the described actions because some steps may be performed in different sequences or at the same time in accordance with the present disclosure. Next, those skilled in the art should appreciate that the embodiments described in the specifications are preferred embodiments, and the related actions and modules are not necessary in the present disclosure.

In the above-mentioned embodiments, emphases on descriptions of each embodiment are different. Portions which are not described in detail in one embodiment can be referred to related descriptions of other embodiments.

It should be appreciated by those skilled in the art that all or part of the steps of the method described in the embodiments above may be executed by relevant hardware instructed by a program that may be stored in a computer-readable memory medium. When the program is performed, the steps of the method described in the embodiments are performed. The readable memory medium may include various media capable of storing codes of the program, such as a read-only memory (ROM), a random access memory (RAM), a magnetic disk, a compact disc and so on.

It should be noted that the embodiments described above are merely preferred ones of the present disclosure but are not limitations to the protection scope of the present disclosure, and any variations or substitutions easily devised by those skilled in the art without departing from the spirit of the present disclosure fall within the scope of the protection. Therefore, the protection scope of the present disclosure shall be subject to that specified by the appended claims.

What is claimed is:

1. A method for implementing near field communication (NFC), the method comprising:

modulating a digital signal to generate an audio signal with a transmitting device by utilizing a binary frequency shift keying (2FSK) modulation scheme;

playing the generated audio signal by the transmitting device;

receiving the audio signal by a receiving device;

sampling the audio signal by the receiving device, wherein a sampling frequency for sampling the audio signal by the receiving device is 48 KHz, a channel number used by the receiving device is a single channel, and a quantization used by the receiving device is an 8-bit quantization; and demodulating the sampled audio signal for obtaining the digital signal by the receiving device, wherein a modulating frequency of a binary bit "0" in the digital signal is set as 12 KHz, a modulating frequency of a binary bit "1" in the digital signal is set as 16 KHz, and a modulating width is set to have 1000 sampling points in the 2FSK modulation scheme, wherein the step of demodulating the sampled audio signal for obtaining the digital signal by the receiving device comprises:

transforming the sampled audio signal from a time domain signal to a frequency domain signal;

analyzing the sampled audio signal in the frequency domain by using 64 points as an analyzing period;

outputting "0" as an output result if a frequency of one point having a maximum power is closest to 12 KHz;

outputting "1" as an output result if a frequency of one point having a maximum power is closest to 16 KHz;

performing a statistical analysis on the output results by using a window with a length of 16 bits;

demodulating the digital signal as "1" if "1" in the output results within the windows occurs more;

demodulating the digital signal as "0" if "0" in the output results within the windows occurs more; and shifting the window for continuing to performing the statistical analysis on the output results until obtaining the entire digital signal.

2. The method according to claim 1, wherein the step of shifting the window comprises:

setting a count value into 0 as an initial value thereof;
traversing the output results within the window;
increasing the count value by 1 when traversing to "1";
decreasing the count value by 1 when traversing to "0";
shifting the window in accordance with a distance, wherein a maximum absolute value of the count value indicates the distance to shift the window.

3. The method according to claim 1, wherein the step of playing the generated audio signal is implemented by a speaker of the transmitting device, and the step of receiving the audio signal is implemented by a microphone of the receiving device.

4. A system for implementing near field communication (NFC), the system comprising:

a transmitting device for modulating a digital signal to generate an audio signal by utilizing a binary frequency shift keying (2FSK) modulation scheme and playing the generated audio signal; and a receiving device for receiving the audio signal, sampling the audio signal and demodulating the sampled audio signal for obtaining the digital signal, wherein a modulating frequency of a binary digital signal "0" in the digital signal is set as 12 KHz, a modulating frequency of a binary digital signal "1" in the digital signal is set as 16 KHz, and a modulating width includes 1000 sampling points in the 2FSK modulation scheme, wherein the receiving device samples the audio signals by using a sampling frequency of 48 KHz, a single channel and an 8-bit quantization, and the receiving device transforms the sampled audio signal from a time domain signal to a frequency domain signal, analyzes the sampled audio signal in the frequency domain by using 64 points as an analyzing period, outputs "0" as an output result if a frequency of one point having a maximum power is closest to 12 KHz, and outputs "1" as an output result if a frequency of a point having a maximum power is closest to 16 KHz, performs a statistical analysis on the said output results by using a window with a length of 16 bits, and shifts the window for continuing to perform the statistical analysis on the output results until obtaining the entire digital signal, wherein if "1" in the output results within the window occurs more, then the digital signal is demodulated as "1", and if "0" in the output results within the window occurs more, then the digital signal is demodulated as "0".

5. The system according to claim 4, wherein the receiving device sets a count value into 0 as an initial value thereof, traverses the output results within the window, increases the count value by 1 when traversing to "1", decreases the count value by 1 when traversing to "0", and shifts the window in accordance with a distance, wherein a maximum absolute value of the count value indicates the distance to shift the window.

6. The system according to claim 4, wherein the transmitting device comprises a speaker for playing the generated audio signal, and the receiving device comprises a microphone for receiving the audio signal.

* * * * *